Jan. 10, 1956  J. F. KLINKHAMER  2,730,633
ELECTRO-MECHANICAL RESONATOR
Filed July 6, 1953
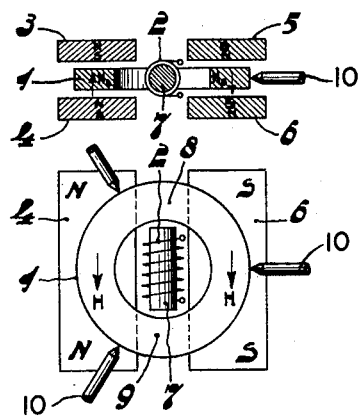
*INVENTOR*
JACOB FREDRIK KLINKHAMER
BY *Fred M Vogel*
*AGENT*

United States Patent Office 2,730,633
Patented Jan. 10, 1956

2,730,633
ELECTRO-MECHANICAL RESONATOR

Jacob Fredrik Klinkhamer, Eindhoven, Netherlands, assignor to Hartford National Bank and Trust Company, Hartford, Conn., as trustee Application July 6, 1953, Serial No. 366,283

Claims priority, application Netherlands July 9, 1952

4 Claims. (Cl. 310—26)

This invention relates to electro-mechanical transducing devices, more particularly, to electro-mechanical transducing devices or electromechanical resonators employing a magneto-strictive member.

U. S. Patent No. 2,692,344 describes an electro-mechanical transducer in which a magneto-strictive vibrator member is set into torsional vibration, i. e., the upper surface of the member exhibits a periodically changing twist relative to its bottom surface. This is accomplished by providing a radially-symmetrical, hollow, annular or tubular member which is disposed in a polarizing field extending substantially parallel to the axis of rotation of the member, a winding being provided about an axial section of the member for carrying alternating current. The axially-directed polarizing field and the tangentially-directed alternating field produced by the winding at every point of the vibrator member causes torsional vibration of the vibrator member with a high electro-mechanical coupling factor. This device has, however, a limitation in that the winding is provided about an axial section of the vibrator member.

The principal object of the invention is to provide an electro-mechanical transducing device of the aforesaid kind in which the winding is not disposed about the vibrating member.

According to the invention, the winding is provided around an additional ferromagnetic core which is freely arranged, that is to say not impeding the vibration, between two diametrically opposed points of the radially symmetrical vibrator member, the axially-directed polarizing field for both vibrator-member halves located between said diametrically-opposed points being oppositely directed.

The invention will now be described with reference to the accompanying drawing in which:

Fig. 1 shows a cross-sectional view of one embodiment of a transducer according to the invention;

Fig. 2 is a plan view of the device shown in Fig. 1.

Referring to the drawing, the electro-mechanical transducer of the invention comprises a hollow, magneto-strictive vibrator member 1 of radially-symmetrical form, in which axially-directed polarizing fields Ho are produced by means of permanent magnets 3, 4 and 5, 6 and tangentially-directed alternating fields H are produced by means of an electrical oscillation supplied to a winding 2, the two fields causing the member to exhibit torsional vibration, that is to say, the upper surface of the member exhibits a periodically-changing twist relative to its bottom surface.

In order that the winding 2 itself need not surround an axial section of the vibrator member 1, a ferromagnetic auxiliary core 7 is provided between two diametrically-opposed points 8 and 9 of the vibrator member 1. Consequently, the alternating magnetic field H produced in the vibrator member 1 by means of the winding 2 has, along the center line of the ring in the left-hand half of the member 1, a direction opposite to that in the right-hand half. In order to obtain the desired torsional vibration, the magnets 3, 4 and 5, 6 have directions of polarization N. S. such that the field Ho in the left-hand part of the member 1 is likewise oppositely directed to that set up in the right-hand half, with the result that the mechanical vibration support each other in both parts of the member 1. The winding 2 and the core 7 are both conventionally mounted in a stationary position with relation to the magnets 3, 4 and 5, 6 so as to be free of the vibrating member 1.

In a similar manner to that described in the aforesaid U. S. patent, the vibrating member may be supported at points along its nodal plane by three pins 10 without interfering with its vibrations.

The vibrating member 1 preferably consists of a highly permeable, substantially electrically non-conductive material, e. g., a ferromagnetic ferrite. The permanent magnets are also preferably electrically non-conductive, e. g., one of the permanent magnet materials described in British Patent No. 708,127. Further details on the materials suitable for this device may be found in the U. S. patent mentioned before.

While we have described our invention in connection with specific embodiments and applications, other modifications thereof will be readily apparent to those skilled in this art without departing from the spirit and scope of the invention as defined in the appended claims.

What is claimed is:

1. An electro-mechanical vibrating device comprising a magneto-strictive annular member consisting of a highly magnetically permeable substantially electrically non-conductive material and having a given axis extending through the center thereof, a ferromagnetic core supported between but spaced from two diametrically-opposed points of the annular member, a winding on said core for carrying alternating current, means for producing a polarizing field parallel to said given axis in one direction for one-half of the magneto-strictive member located between said diametrically-opposed points, and means for producing a polarizing field parallel to said given axis in the opposite direction to said one direction in the other half of the magneto-strictive member, whereby the member is torsionally vibrated when alternating current traverses said winding.

2. An electro-mechanical vibrating device comprising a magneto-strictive annular member consisting of a highly magnetically permeable substantially electrically non-conductive material and having a given axis extending through the center thereof, a ferromagnetic core disposed in the center of and supported between but spaced from a pair of diametrically-opposed points of the magneto-strictive member, a winding only on said core for carrying alternating current, a pair of permanent magnets disposed on opposite sides of one half of the magneto-strictive member located between said diametrically-opposed points for producing a polarizing field parallel to said given axis in one direction in said one half, and another pair of permanent magnets disposed on opposite sides of the other half of said magneto-strictive member for producing a polarizing field parallel to said given axis in the opposite direction to said one direction in said other half, whereby the member is torsionally vibrated when alternating current traverses the winding.

3. An electro-mechanical vibrating device as claimed in claim 2 in which means are provided for supporting the magneto-strictive member at points along its nodal plane.

4. An electro-mechanical vibrating device as claimed in claim 1 in which the core and the winding on the core are positioned in a direction such that the field produced when alternating current passes through said winding is transverse to said given axis.

References Cited in the file of this patent

UNITED STATES PATENTS

| | | |
|---|---|---|
| 2,435,487 | Adler | Feb. 3, 1948 |
| 2,504,719 | Neilson | Apr. 18, 1950 |